No. 745,087. PATENTED NOV. 24, 1903.
W. WEISE.
TABLE RECEPTACLE FOR SANDWICHES, &c.
APPLICATION FILED AUG. 4, 1903.
NO MODEL.

Witnesses:—
C. H. Schining
Gustav Heyde

Inventor:—
Wilhelm Weise
by Paul E. Schining
his attorney

No. 745,087.

Patented November 24, 1903.

UNITED STATES PATENT OFFICE.

WILHELM WEISE, OF HOHENSTEIN-ERNSTTHAL, GERMANY.

TABLE RECEPTACLE FOR SANDWICHES, &c.

SPECIFICATION forming part of Letters Patent No. 745,087, dated November 24, 1903.

Application filed August 4, 1903. Serial No. 168,164. (No model.)

*To all whom it may concern:*

Be it known that I, WILHELM WEISE, a subject of the Emperor of Germany, and a resident of Hohenstein-Ernstthal, Saxony, Germany, have invented certain new and useful Improvements in Table Receptacles for Sandwiches and the Like, of which the following is a specification.

It is an inconvenience that the sandwiches and other comestibles placed on the tables of hotels or on the counters of shops quickly dry or become covered with dust or the like. I overcome this drawback by placing the sandwiches, buttered bread slices, confectionery, or the like in an air-tight receptacle, which may be employed as a table centerpiece, and by providing mechanical means whereby the comestibles may be removed singly from the receptacle.

The receptacle consists of a box or like shaped container of glass, metal, or wood closed above by a cover. The sandwiches or like contents are removed by means of a sliding plate located above the bottom and being of such construction that it can be pulled out in two directions. For this purpose the wall of the receptacle is provided with two apertures closed by members which are not permanently rigidly connected with the plate, but which on being drawn out are coupled to the latter by means of mechanism actuated by raising the handle or knob of the said closing members, the coupling taking place at whichever side desired. At either end of the plate spring-controlled catches are provided, turning on spindles, which catches when the slide is pulled forward rise and carry the sandwich with them, while on the return movement of the plate they close down again.

My invention is illustrated by the accompanying drawings, in which—

Figure 1:
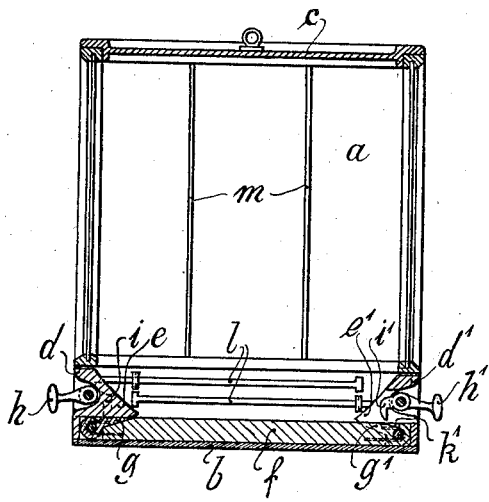
Figure 2:
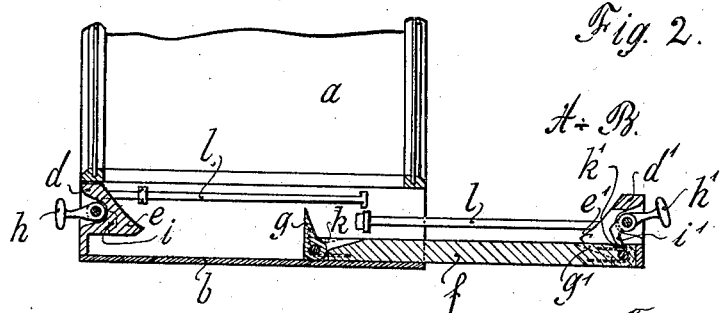
Figure 3:
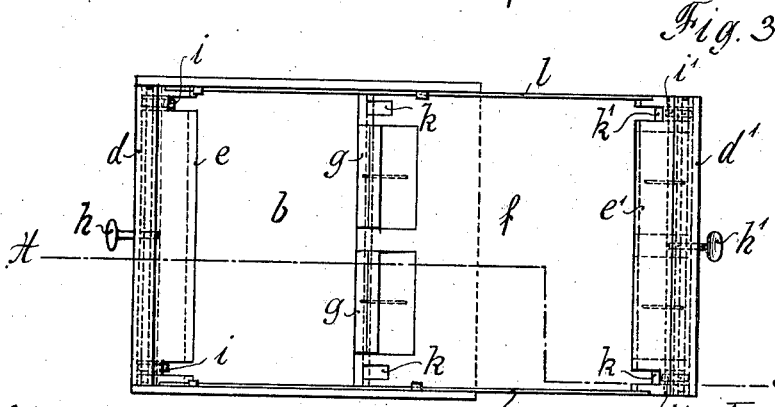

Figure 1 is a vertical section of the apparatus in closed condition. Fig. 2 is a like view of the bottom portion of the same, the plate being drawn out and the section taken on the line A B of Fig. 3. Fig. 3 is a sectional plan of Fig. 2.

$a$ is the receptacle; $b$, the base; $c$, the cover; $d$ and $d'$, panels forming closing members for the apertures through which the contents of the receptacle are removed; $e\ e'$, hollowed or inclined inwardly-projecting portions of the members $d\ d'$; $f$, the sliding plate; $g$, the catches, which on the return motion are depressed by the portions $e\ e'$.

$h\ h'$ are the handles, consisting of double-armed levers passing through the members $d\ d'$ and held in raised position by springs.

$i\ i'$ are hooks engaging in the knobs or grooves $k\ k'$ on the plate.

$l$ represents rods having knobs acting as guides for the uncoupled member $d$ or $d'$ on its being drawn out.

The operation of the apparatus is as follows: The receptacle $a$ is filled with sandwiches or the like, one lying upon the other. In the case of small wares, of which several pieces are to be removed at once, vertical partitions $m$ may be provided for the purpose of maintaining the said wares in vertical columns or piles. The bottom sandwich (or the several bottom small cakes) always lies on the plate $f$. If then one of the handles $h\ h'$ is drawn—for example, the handle $h$—the hooks $i$ of said handle will engage in the knobs or grooves $k$ of the same side of the plate, thus coupling the plate with the member $d$, while the opposite member $d'$ is not coupled. On the handle being pulled still farther it will draw the member $d$ and plate $f$ with it, whereupon the catches $g'$, which until now have been lying depressed below the part $e'$ of the member $d'$, will be released and will rise. These catches now stand upright behind the sandwich lying on the plate and carry it with them, so that the sandwich can be removed from the plate outside the apparatus. The removal of the first sandwich will cause the next one to fall behind the advanced plate $f$. When the latter is again pushed into the apparatus, the catches $g'$ will be depressed by the weight of the sandwich, which they will slightly raise, so that the plate can be again pushed back into its initial position, the sandwich lying upon it ready for removal when desired.

In order to avoid the necessity of the second lowermost sandwich having to be lifted from the bottom $b$ by the plate $f$, as first described, slits may be provided in the latter and upright plates or strips secured to the bottom $b$, so as to fit into the said slits.

If desired, the receptacle may be fitted with mechanism of well-known construction, so as to constitute a coin-freed apparatus.

What I claim is—

1. In combination a receptacle having two opposed apertures, a plate sliding through said apertures, covers closing the latter, spring-controlled double-armed lever-handles for said covers, which handles can be caused to engage independently with said plate, and guides for controlling the motion of the covers, all substantially as described.

2. In combination a receptacle having two opposed apertures, a plate sliding through said apertures, and having spring-actuated catches at either end, covers closing said apertures and having inwardly-projecting portions which depress the said catches, spring-controlled double-armed lever-handles for said covers, which handles can be caused to engage independently with said plate, and guides for controlling the motion of the covers, all substantially as described.

In testimony that I claim the foregoing as my invention I have signed my name in presence of two subscribing witnesses.

WILHELM WEISE.

Witnesses:
C. H. SCHILLING,
PAUL ARRAS.